C. G. KING.
BROOCH.
APPLICATION FILED APR. 3, 1912.
1,203,882.
Patented Nov. 7, 1916.
2 SHEETS—SHEET 1.
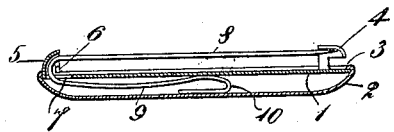
Fig. 1.
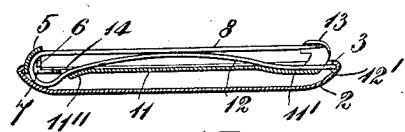
Fig. 2.
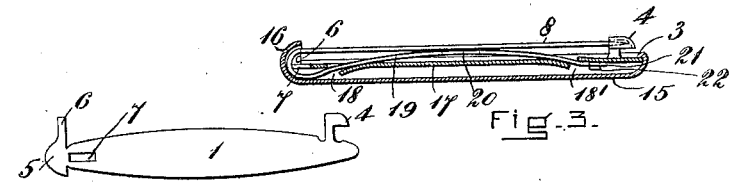
Fig. 3.
Fig. 4.
Fig. 5.
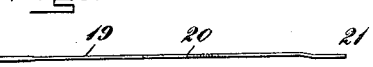
Fig. 6.
Fig. 7.
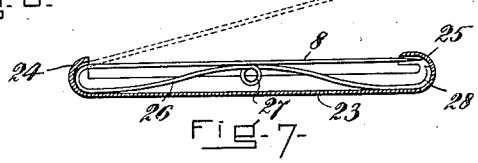
Fig. 8.
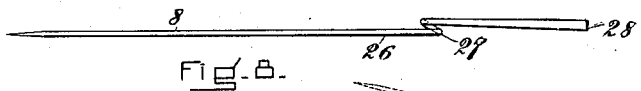
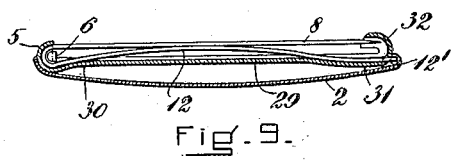
Fig. 9.
Fig. 10.
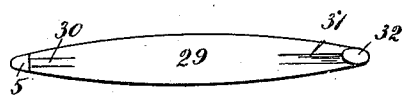
Fig. 11.
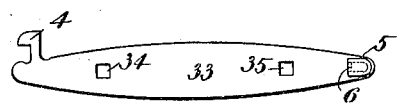
Fig. 12.
WITNESSES:
Patrick J. Conroy.
E. B. Tomlinson.
INVENTOR:
Clifford G. King,
by J. Browne & Woodworth
atty's.

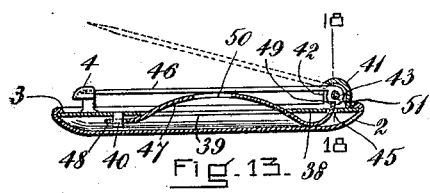
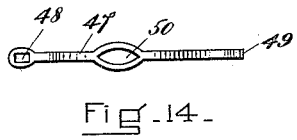
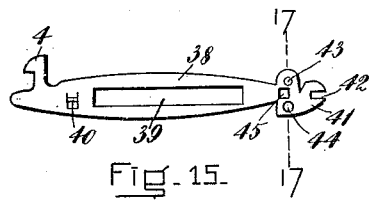
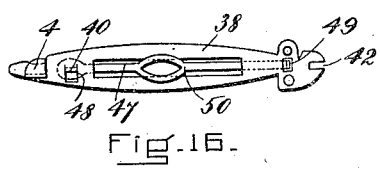
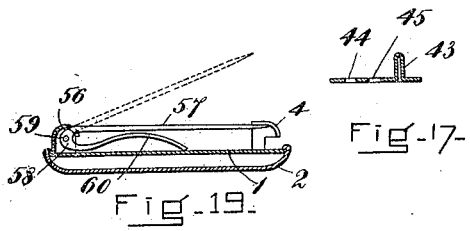
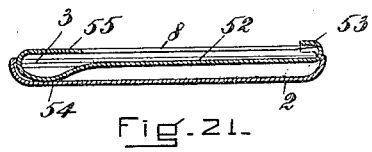
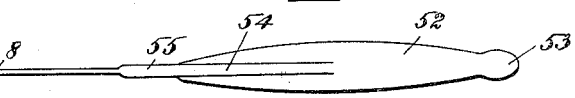
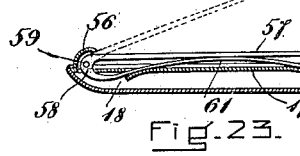
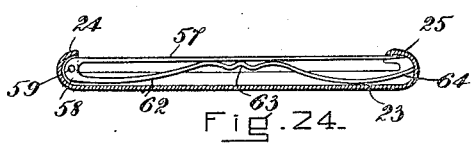
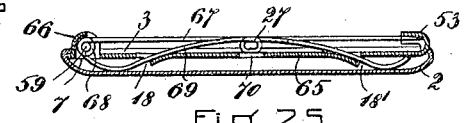

UNITED STATES PATENT OFFICE.

CLIFFORD G. KING, OF PROVIDENCE, RHODE ISLAND.

BROOCH.

1,203,882.  Specification of Letters Patent.  Patented Nov. 7, 1916.

Application filed April 3, 1912.  Serial No. 688,217.

*To all whom it may concern:*

Be it known that I, CLIFFORD G. KING, a citizen of the United States, and a resident of Providence, in the county of Providence and State of Rhode Island, have invented a new and useful Improvement in Brooches, of which the following is a specification.

My invention relates to brooches or similar pins and its object is to improve and simplify the construction thereof in the manner hereinafter set forth.

My invention will be described with reference to the accompanying drawings which show several specific embodiments thereof, while its scope will be more particularly pointed out in the appended claims.

In the drawings,—Figure 1 is a longitudinal section of a three-piece pin constructed in accordance with my invention. Figs. 2 and 3 are similar views of modifications. Fig. 4 represents a blank that may be employed for making the back-plate of the pin shown in Fig. 1. Fig. 5 represents a plan view of a blank for forming the pin-tongue and spring-bridge shown in Fig. 3, and Fig. 6 is a side view of said blank. Fig. 7 is a longitudinal section of a two-piece pin constructed in accordance with the present invention, and Fig. 8 shows the pin-tongue and spring-bridge thereof before bending. Figs. 9 and 10 are longitudinal sections of further modifications. Fig. 11 is a plan view of the back-plate shown in Fig. 9, and Fig. 12 shows the blank employed for forming the back-plate shown in Fig. 10. Fig. 13 is a longitudinal section of a four-piece pin constructed in accordance with the present invention. Fig. 14 is a plan view of the spring-bridge shown in Fig. 13. Fig. 15 shows the blank for making the back-plate of the pin shown in Fig. 13. Fig. 16 is a plan view of said blank showing the spring-bridge in place. Fig. 17 is a section on the line 17—17 of Fig. 15, and Fig. 18 is a section on the line 18—18 of Fig. 13. Fig. 19 is a longitudinal section of a further modification consisting of a three-piece pin provided with a hinge for the pin-tongue. Fig. 20 is a longitudinal section of a modification of the pin shown in Fig. 7. Fig. 21 is a longitudinal section of a modified form of two-piece pin. Fig. 22 represents the blank from which the back-plate and pin-tongue shown in Fig. 21 may be formed. Fig. 23 is a longitudinal section of a further modification consisting of a three-piece pin provided with a hinge for the pin-tongue. Fig. 24 is a longitudinal section of a further modification showing a two-piece pin having its pin-tongue pivoted or hinged to the front plate. Fig. 25 is a longitudinal section of still another modification consisting of a three-piece pin provided with a hinge for the pin-tongue.

In the particular drawings selected for more fully disclosing my invention, the back-plate 1 (see Fig. 1), preferably formed from a blank corresponding to that shown in Fig. 4, is provided at one end with a suitable catch 4 for retaining the point of the pin-tongue and at the other end with a hood 5 for protecting and guiding the bent portion of the pin-tongue. The particular form of back-plate herein shown and described is intended in practice to be provided with an ornamental cover or front-plate 2, the edges of which may be rolled over the back-plate as shown at 3, or otherwise suitably secured thereto, but it will be undertsood that such cover or front plate may be dispensed with wherever desired. The pin-tongue comprises the pointed arm 8 and the unpointed lower arm 9 which as shown in Fig. 1, after passing through the slot 7 in the back-plate is reversely bent at 10 and terminates in a short portion lying flat against the inner side of the front plate. The pin-tongue preferably is made of suitably tempered spring material. I prefer, as shown, in Figs. 1 and 4, to provide a keeper for the bent portion of the pin tongue and said keeper may conveniently be formed by folding over the lip 6 so that it will lie in front of said bent portion transversely of the pin. When the pin point is released from the catch, the elasticity of the lower extension 9, 10 will force the pin-tongue upwardly against the outer edge of the hood which accordingly acts as a stop, so that when opened the pin-tongue is always under tension.

In Fig. 2 the back-plate 11 in addition to the slot 7 is provided with a transverse slot 14 located near the end slot 7 and the other end is provided with a groove 11' and also with a suitable catch 13. The lower arm 12 of the pin-tongue constitutes a spring-bridge passing through the slot 14 over the downwardly bent portion 11'' of the back-plate and along the groove 11' therein, the extreme end 12' passing through a hole in the end of the catch 13. The pin-tongue is so arranged that when the pin-point is secured by the catch the upwardly bowed portion of the arm 12 is in contact with the arm 8.

In the modification shown in Fig. 3, the back-plate in addition to having the slot 7 is provided with two transverse slots 18, 18' located near its ends. In this instance the hood 16 may be formed integral with the front-plate 15. As shown more clearly in Figs. 5 and 6, the lower arm 19 of the pin-tongue is bifurcated at 20 to afford a larger bearing surface for the fabric. The unpointed end 21 of the pin-tongue may be secured to the under side of the back-plate by the gripping fingers 22 and preferably the edges of the back-plate adjacent to the transverse slots are bent downwardly to accommodate the bow of the arm 19.

It will be noted that in both the forms shown in Figs. 2 and 3 the spring-bridge always maintains the upper arm 8 of the pin-tongue under tension against the hood whenever the pin point is released from the catch. In addition to serving as a stop for the pin-tongue the hood protects the bent portion of said tongue and gives the device greater stability.

In Fig. 7 I have shown one form of my improved brooch in which no back-plate is necessary, the ends of the front-plate 23 having been bent up to form the hood 24 and the pin point retaining catch 25. In this instance I prefer to form a spiral 27 in the lower arm 26 of the pin-tongue for the two-fold purpose of increasing the elasticity of the spring-bridge and also affording a larger bearing surface for the fabric. When the pin is closed the arm 8 may extend down into said spiral if desired, and for this purpose as shown in Fig. 8, the spires are sufficiently separated. The end 28 of the spring-bridge is carried part way up into the curved end 25 and, if desired, swaged therein by laterally compressing the upturned end of the front-plate on said end portion 28.

In the three-piece pin shown in Fig. 9, the back-plate 29 has no end or lateral slots, but in place thereof longitudinally-extending grooves 30, 31 are provided for receiving the extremities of the spring-bridge 12, one end 12' of said spring-bridge passing through a hole in the end of the catch 32 which is integral with the back-plate. In this case both arms of the pin-tongue are above the back-plate.

In Fig. 10 the back-plate 33 is provided with two transverse slots 34, 35 located near the ends thereof and the catch 4 and hood 5 are formed integral therewith as above described in connection with Fig. 1. The lower arm 36 of the pin-tongue passes under the hood and is threaded through said transverse slots, that portion thereof lying between said slots preferably being corrugated as shown and the end 37, which may be flattened, extending a short distance along the under side of the back-plate.

In the four-piece brooch shown in Fig. 13, the back-plate 38, which may be formed from the blank shown in Fig. 15, is provided with a longitudinal slot 39 extending throughout the greater portion of its length and with a short transverse slot 45 directly under the hood 41. As shown in detail in Figs. 17 and 18, the pivot 43 is cupped up from the blank and the coöperating hole 44 punched in the opposite side of the hood blank. The spring-bridge 47 in this case is formed separately from the pin-tongue 46 and is held in position by the engagement of the slot 48 in one end thereof with the lug 40 struck out from the back-plate while its other end 49 projects upwardly through the above mentioned slot 45 to coöperate with the flattened end portion 51 of the pin-tongue. The pin-tongue is placed in position and then the sides of the hood blank are bent upwardly along longitudinal lines, the cupped pivot 43 is inserted through the corresponding hole in the head of the pin-tongue and finally forced through its coöperating hole 44, thereby to hinge the pin-tongue in position, while the slotted portion of the hood blank is bent over on a transverse line thereby to form the top of the hood which is so arranged that it forms a stop for the pin-tongue and its slot 42 fits over the latter.

In this case as in those above described in which the spring-bridge is integral with the pin-tongue, the latter is always held under tension by the spring-bridge because the upturned end 49 of the latter is placed as shown slightly ahead of the center of the pin-tongue pivot and tends to force the pin-tongue against the hood. The middle portion of the bridge may be slotted and spread as shown at 50 for the purpose above explained in connection with Fig. 3.

In the modification of Fig. 7 which I have shown in Fig. 20, the hood 24 and catch 25 are integral with the front-plate 23, the edges of which are rolled over the back-plate 17 which is provided with the transverse slots 18, 18' for positioning the spring-bridge 12. In this case inasmuch as the front-plate is usually of gold or similar material, the bridge has the advantage of being better protected than where the hood and catch are formed on the back-plate as shown for example in Fig. 1.

In Fig. 21 the pin-tongue 8 is integral with the back-plate 52. As shown in Fig. 22, a tongue 54 is stamped out of the back-plate and a portion thereof reversely bent while the section thereof shown at 55 is carried parallel to the back-plate and terminates in the pointed portion 8. The catch 53 is integral with the back-plate, and the front-plate, if employed, has its edges rolled over said back-plate as shown at 3.

In Figs. 19, 23, 24 and 25, the pin-tongues are pivoted by the rivet 59 or other suitable means to the arms or trunnions 56 or the hoods 24 or 66.

In Fig. 19 the pivoted portion of the pin-tongue is flattened and then extended to form a spring-arm 60, the effect of which as shown is to maintain the pin-tongue 57 when open under tension against the arm 56 which serves as a stop.

In Fig. 23 the back-plate 17 is substantially the same as that shown in Fig. 3 with the exception that the arms 56 are integral therewith. Here the lower arm 61 of the pin-tongue 57 passes through the slots 18, 18′ and is bowed upwardly to form a spring-bridge.

In Fig. 24 no back-plate is employed and the front-plate 23 is identical with that already described in connection with Fig. 7. In this case the lower arm 62 of the pin-tongue is corrugated at 63 and the outer end 64 thereof bears against the catch 25.

In Fig. 25 the back-plate 65 is provided with the intermediate slots 18, 18′, the end slot 7 and a central slot 70. The pin-tongue 67 is bent into a spiral 68 through which passes the pivot 59 hinging said pin-tongue to the hood 66 which serves to protect said spiral. The lower arm 69 is also formed into a spiral 27 in the manner above described in connection with Fig. 7 and this spiral may be depressed into the central slot 70 thereby permitting a relatively thick fabric to be secured by the pin. In the pin shown in Fig. 25, the hood 66 is so constructed that the use of a rivet in the pin-tongue spiral joint 68 may be eliminated.

It will be noted that in the embodiments of my invention shown in Figs. 19, 23, 24 and 25 in which the pin-tongue is pivoted, as well as in the other forms of my invention in which no pivot is employed, the elasticity of the spring-bridge serves both to press the pin-tongue upwardly to throw it out of locked position when the point is disengaged and also to maintain it under pressure against a stop. The user may more readily insert the pin into a fabric by grasping the body portion of the brooch when the pin-tongue is so maintained under tension against the stop, than if it were not held tightly against the same or did not touch it at all.

It will be obvious that I am not limited to the specific details which I have illustrated herein, since these have been submitted for illustrative purposes only and may be widely varied and altered within the scope of the appended claims without departing from the spirit of my invention.

I claim:

1. In a pin, a pin-tongue of spring material bent upon itself and comprising an upper and a lower arm, said lower arm being provided with an enlarged bearing surface for the fabric, a plate, pin-point-retaining means near one end of said plate and a stop near the other end thereof, the lower arm of said pin-tongue being upwardly bowed and constituting a spring-bridge for maintaining said upper arm when released from said retaining-means under tension against said stop.

2. In a pin, a pin-tongue of spring material bent upon itself and comprising an upper and lower arm, the middle portion of said lower arm being bent into a spiral, a plate, pin-point-retaining means near one end of said plate and a stop near the other end thereof, the lower arm of said pin-tongue being upwardly bowed and constituting a spring-bridge for maintaining said upper arm when released from said retaining means under tension against said stop.

3. In a pin, a front-plate having a hood and pin-point-retaining means formed integral with the opposite ends thereof, a pin-tongue of spring material bent upon itself and comprising an upper and lower arm, the lower arm of said pin-tongue being provided with an enlarged bearing surface for the fabric and constituting a spring-bridge for maintaining said upper arm when released from said pin-point-retaining means under tension against said hood.

4. In a pin, a front-plate having a hood and pin-point-retaining means formed integral with the opposite ends thereof, a pin-tongue of spring material bent upon itself and comprising an upper and a lower arm, the middle portion of said lower arm being formed into a spiral and said lower arm constituting a spring-bridge for maintaining said upper arm when released from said pin-point-retaining means under tension against said hood.

5. In a pin, a front-plate having a hood and pin-point-retaining means formed integral with the opposite ends thereof, a pin-tongue of spring material bent upon itself and comprising an upper and a lower arm, the bent portion of said pin-tongue being arranged within said hood, and the end of said lower arm being secured to said front-plate at the end of the latter which forms pin-point-retaining means.

6. In a pin, a front-plate having a hood and pin-point-retaining means formed integral with the opposite ends thereof, a pin-tongue of spring material bent upon itself and comprising an upper and a lower arm, the bent portion of said pin-tongue being arranged within said hood, and the end of said lower arm being swaged to said front-plate at the end of the latter which forms the pin-point-retaining means.

7. In a pin, a pin-tongue of spring material bent upon itself and comprising an upper and lower arm, a plate, pin-point-retaining means near one end of said plate, and a stop near the other end of said plate, the lower arm of said pin-tongue constituting a spring-bridge and having a fixed point of support on said plate whereby said upper arm when released from said retaining means is maintained under tension against said stop.

8. In a pin, a pin-tongue of spring material bent upon itself and comprising an upper and lower arm, a plate, pin-point-retaining means near one end of said plate and a hood near the other end of said plate for protecting the bent portion of said pin-tongue, the lower arm of said pin-tongue constituting a spring-bridge and having a fixed point of support on said plate whereby said upper arm when released from said retaining means is maintained under tension against said hood.

9. In a pin, a front-plate having a hood and pin-point-retaining means formed integral with the opposite ends thereof, a pin-tongue of spring material bent upon itself and comprising an upper and a lower arm, the lower arm of said pin-tongue being provided with an enlarged bearing surface for the fabric, the bent portion of said pin-tongue being arranged within said hood and the end of said lower arm being secured to said front-plate at the end of the latter which forms the pin-point-retaining means.

10. In a pin, a front plate having a stop and pin-point-retaining means formed integral with the opposite ends thereof, a pin-tongue of spring material bent upon itself and comprising an upper and a lower arm, the lower arm of said pin-tongue being provided with an enlarged bearing surface for the fabric and constituting a spring-bridge for maintaining said upper arm when released from said pin-point-retaining means under tension against said stop, and the end of said lower arm being secured to said front-plate at the end of the latter which forms the pin-point-retaining means.

In testimony whereof, I have hereunto subscribed my name this first day of April 1912.

CLIFFORD G. KING.

Witnesses:
F. WEBSTER COOK,
EDWARD I. BROWNELL.

Copies of this patent may be obtained for five cents each, by addressing the "Commissioner of Patents, Washington, D. C."